United States Patent [19]

Frisch

[11] Patent Number: 5,212,644
[45] Date of Patent: May 18, 1993

[54] INCREMENTAL RATE LOCKER SYSTEM

[75] Inventor: Pierre Frisch, Veneux de Sablons, France

[73] Assignee: Mors Technologies, Inc., Delson, Canada

[21] Appl. No.: 616,186

[22] Filed: Nov. 20, 1990

[51] Int. Cl.$^5$ .............................................. G06F 15/20
[52] U.S. Cl. .............................. 364/464.01; 235/91 D; 235/378; 364/467; 377/20
[58] Field of Search ........................... 235/378, 91 D; 364/464.01, 464.04, 467; 377/20

[56] References Cited

U.S. PATENT DOCUMENTS

| | | | |
|---|---|---|---|
| 3,670,177 | 6/1972 | Inoue et al. | 307/141,4 |
| 3,775,593 | 11/1973 | Gieringer et al. | 377/20 X |
| 3,789,968 | 2/1974 | Inoue et al. | 194/1 N |
| 3,831,408 | 8/1974 | Featherman | 70/84 |
| 3,917,046 | 11/1975 | Yorisue et al. | 194/9 T |
| 4,065,663 | 12/1977 | Edwards, II | 364/467 |
| 4,072,223 | 2/1978 | Kinoshita et al. | 194/54 |
| 4,088,873 | 5/1978 | Kinoshita et al. | 235/92 AC |
| 4,122,935 | 10/1978 | Inoue et al. | 194/32 |
| 4,162,530 | 7/1979 | Kusui et al. | 364/464.04 |
| 4,204,635 | 5/1980 | Hofmann et al. | 235/382 |
| 4,317,175 | 2/1982 | Sterling et al. | 364/464.04 |
| 4,355,361 | 10/1982 | Riggs et al. | 364/464.04 |
| 4,516,213 | 5/1985 | Gidden | 364/464.04 X |
| 4,717,815 | 1/1988 | Tomer | 364/467 X |
| 4,773,020 | 9/1988 | Anderson et al. | 364/464.01 |
| 4,908,769 | 3/1990 | Vaughan et al. | 364/464.04 |

FOREIGN PATENT DOCUMENTS

| | | |
|---|---|---|
| 0065605 | 12/1982 | European Pat. Off. . |
| 0164630 | 12/1985 | European Pat. Off. . |
| 2938398 | 4/1981 | Fed. Rep. of Germany . |
| 2078845 | 1/1932 | United Kingdom . |

OTHER PUBLICATIONS

"Logibag Electronic Locker Remote Control Software Product Description": Mors Techologies Inc. Quebec, Canada; Oct. 11, 1989; pp. 1–21.

Primary Examiner—Kevin J. Teska
Assistant Examiner—Edware R. Cosimano
Attorney, Agent, or Firm—Wolf, Greenfield & Sacks

[57] ABSTRACT

The remote control units of a electronic centralized locker system are programmed with incremental rate parameters, such that the rental fee for each locker increases as the time period during which the locker is used increases. In order to implement the incremental rate structure, the total rental time is broken into a number of subperiods and a separate incremental fee is charged for each subperiod. In accordance with the invention, it is also possible to set the number of subperiods over which a fee will be charged, before a maximum fee is reached. Once the maximum fee is reached, the locker rental charge does not increase.

21 Claims, 7 Drawing Sheets

INCREMENTAL RATE LOCKER SYSTEM

BACKGROUND OF THE INVENTION

The present invention relates to left luggage locker systems, and in particular, to electronic locker systems which incorporate variable rental rates.

BACKGROUND OF THE INVENTION

Left luggage locker systems have been in use in transportation terminals for many years. Most of the locker systems presently in use are mechanical devices in which each locker is a separate "stand alone" unit to which access is controlled by mechanical locking apparatus which both secures the locker door and accepts and validates coins.

The stand-alone nature of mechanical lockers cause difficulties with the administration and maintenance of such a system. In particular, the cost of maintaining and servicing the mechanical units is relatively high because there is no way to detect broken units, units that need maintenance or units that are full of coins from a central location. Consequently, it is necessary to have personnel visit each locker at its location to check the locker condition. Further, with such a system there is no way to easily monitor each of the units to detect how much the units are being used in order to obtain usage information over the entire locker system so that the lockers can be properly located to maximize user convenience. Another problem occurs when a group of lockers or all lockers must be quickly opened as, for example, might occur during a police search. The mechanical system requires a considerable amount of time to manually open each locker even if a master key for all lockers is provided.

Due to the aforementioned problems, the mechanical systems are frequently poorly maintained and improperly located so that travelers tend not to use the systems. As the systems become unused and revenue generated thereby deteriorates, maintenance and administration decrease, in turn, causing further loss of revenue. Eventually, the entire locker system falls into disuse.

In order to overcome some of the shortcomings of mechanical locker systems, centralized electronic locker systems have been developed. These latter systems typically use a central computer that is monitored by a local attendant. The centralized computer is connected by an electrical network to a plurality of outlying remote control units that, in turn, control a nearby set of lockers. Each remote control unit can monitor the usage and state of each of the lockers associated with it and information gathered by the unit can be sent back to the central computer so that malfunctions can be quickly detected and corrected by a single attendant or a small staff. In addition, usage information can be easily gathered on all of the lockers. Further, since a control of all of the lockers is centralized, a group of lockers or all lockers can be opened from the central location to allow searches by the police of others in selected situations.

Thus, the electronic locker system overcome many of the advantages of the original prior art mechanical system. However, in the electronic locker systems now in operation, it is difficult to properly set the usage fee such that a proper fee balance is achieved between travelers who leave their luggage only for short time in the locker system and travelers who leave their luggage for a longer time. This problem arises because present locker systems, like their mechanical counterparts use a flat or fixed rate fee. The fee is the same for locker rental no matter how long the locker is used. If the fixed fee is set to provide a reasonable fee rate for those leaving their luggage for only short time, then any insufficient revenues are collected from the long term users. Alternatively, if the fee is set so that a reasonable fee is collected from both long term and short term users, short term users are penalized and the use of the locker system decreases significantly.

Accordingly, it is an object of the present invention to provide an electronic locker system in which a variable rate fee which depends upon the time duration of use can be applied to each locker.

It is another object of the present invention to provide an electronic locker system in which locker rental time can be broken up into a group of subintervals, and a separate charge applied to each subinterval.

It is a further object of the present invention to provide an electronic locker system in which the locker rental rate parameters can be programmed into separate locker areas from a central location.

It is still another object of the present invention to provide an electronic locker system in which a maximum rental rate can be established which limits the maximum rate that can be charged for locker rental.

SUMMARY OF THE INVENTION

The foregoing objects are achieved and the foregoing problems are solved in one illustrative embodiment of the invention in which the remote control units of a centralized locker system are programmed with incremental rate parameters, such that the rental fee for each locker increases as the time period during which that locker is used increases.

More particularly, the total rental time is broken into a number of subperiods and a separate fee is charged for each subperiod. In accordance with the invention, it is also possible to set the number of subperiods over which an incremental fee will be charged, before a maximum fee is reached. Once the maximum fee is reached, the locker rental charge does not increase even though the rental time increases. The incremental rate system allows the rates to be tailored for both short and long term users to maximize locker use by each of these traveling groups.

In one embodiment of the invention, the incremental rate parameters are manually set at the central location of a centralized locker system and sent over digital transmission networks to the remote control units for each locker area.

DETAILED DESCRIPTION OF THE PREFERRED EMBODIMENT

Figures 1, 4:
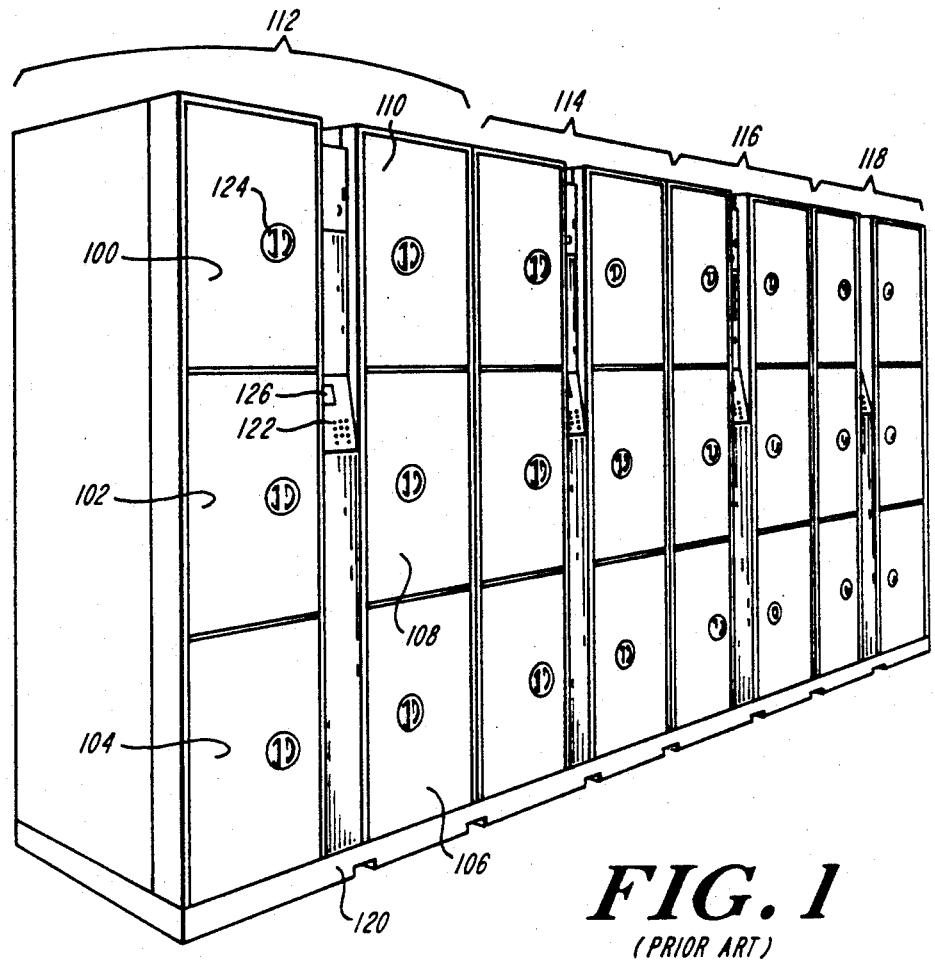
FIG. 1 is a perspective view of a plurality of locker groups in a prior art electronic locker system, with each locker group incorporating an associated remote control unit which controls the lockers in the group.
FIG. 4 is an illustrative display screen illustration indicating the types of rental rate parameters that are

FIG. 1 shows a perspective view of a plurality of locker groups or areas in a typical centralized electronic locker system. The particular system illustrated is sold under the name "LOGIBAG" manufactured by MORS, located at 2/4 rue Isaac Newton, 93152 Le-Blanc Mesnil, Cedex—France and distributed by Mors Technologies, Inc., 225 rue Industrielle, Delson, Quebec, Canada. The LOGIBAG system is a modular locker system in which each group or module of free standing lockers is associated with a remote control unit. The system is available in several configurations in which four, six, eight or more lockers are physically located in a block surrounding the remote control unit.

FIG. 1 shows an illustrative 6-locker configuration consisting of lockers 100-110, which are associated with the remote control unit 120, to complete the 6-locker module 112. Also shown in FIG. 1 are three other locker modules, 114, 116 and 118, each consisting of six lockers and a remote control unit. Different-sized lockers may also be used with the same remote control unit in configurations of four, eight or more units.

Each locker unit is equipped with a electromechanical locking mechanism controlled by a handle, 124, which allows the locker to be opened or closed. Handle 124 can be manually turned and controls a plurality of locking rods which fit into electric solenoids that are controlled by the remote control unit 120. Consequently, action by both the user and the remote control unit are necessary to lock the locker. Remote control unit 120 incorporates a keypad 122 and visual display device 126. Also included, but not shown in FIG. 1, is a printing device which allows remote control unit 120 to print a ticket for the user which ticket indicates the location of the locker, date, time, and a passcode needed to open the locker, among other information.

As previously mentioned, each of locker modules 112-118 is connected to a central location that allows the lockers to be controlled either singly or in blocks, and also allows the central location to monitor the lockers to provide information regarding usage, coin amounts collected, and service problems. In addition, the central location can control the lockers to open the locker doors in emergency or official situations or where the user has lost or misplaced his passcode.

Figure 2:
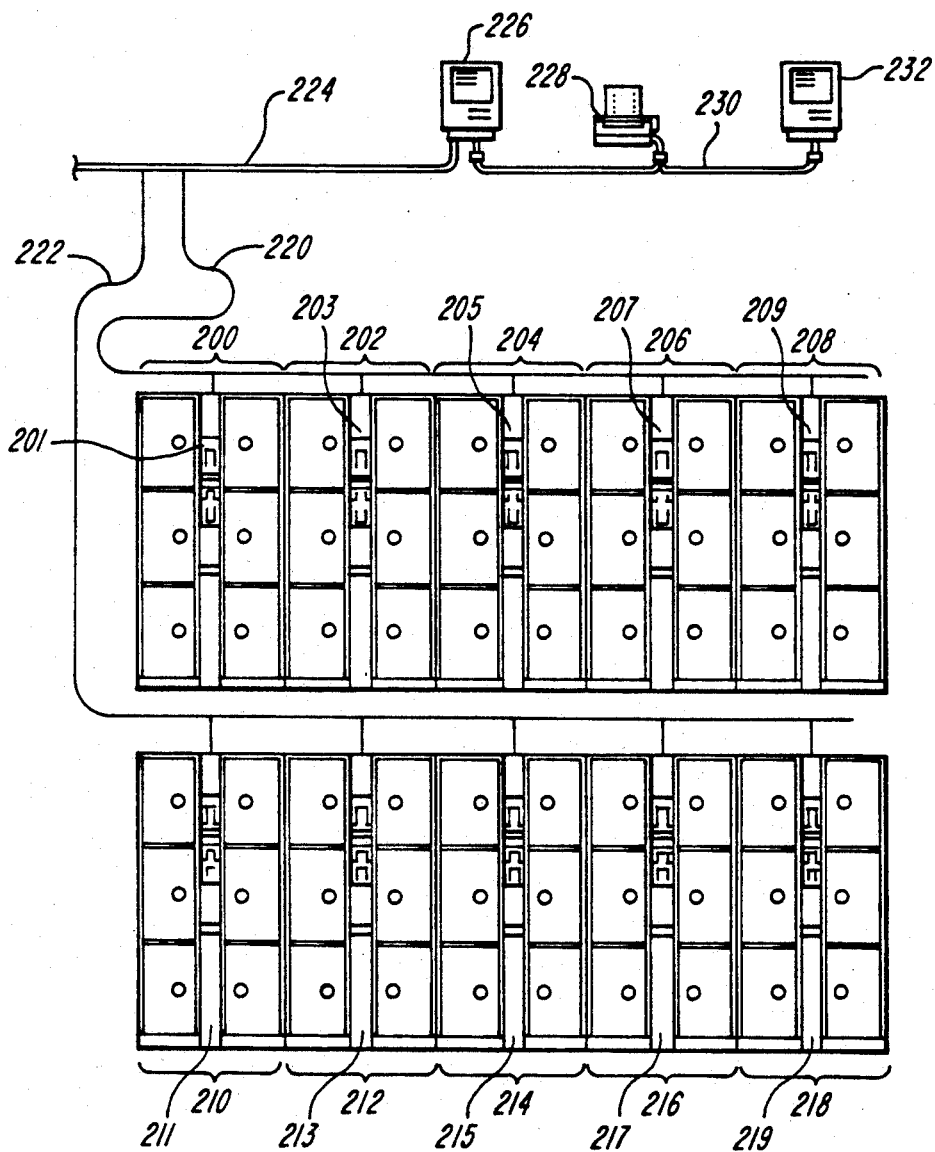
FIG. 2 is a schematic illustration of the prior art electronic locker system illustrating the manner in which data and information is distributed from a centralized computer to each of the remote control units.

More particularly, FIG. 2 schematically illustrates a locker system consisting of 10 locker modules, 200, 202, 204, 206, 208, 210, 212, 214, 216 and 218. Each locker module is similar to that shown in FIG. 1 in that it consists of six separate lockers clustered a remote control unit. Each of the ten remote control units, 201-219, is, in turn, connected to a data bus for transfer of digital information between a central computer and each remote unit. For example, remote control units 201, 203, 205, 207 and 209 are connected to data bus 220. In a similar manner, remote control units 211, 213, 215, 217 and 219 are connected to data bus 222. Data buses 220 and 222 are, in turn, connected to a data bus 224, which is connected to a centralized computer.

Illustratively, the centralized computers may be connected in a local area network (LAN) consisting of computers 226 and 232. Illustratively, computer 226 may be a MACINTOSH SE manufactured by the Apple Computer Corporation, Cupertino, Calif. In a similar manner, computer 232 may be another MACINTOSH computer. These computers are connected together by means of an APPLETALK IW local area network 230, also manufactured by Apple Computer Corporation. Other computer and LAN configurations can be substituted for that illustrated without affecting the spirit an scope of the invention. An optional printer 228 may also be provided, which allows reports generated by computer 226 to be printed out for later analysis.

Data buses 220 and 222 are connected to the data bus 224 of computer 226 in a conventional manner by means of interface circuits (not shown), which are well-known. The transfer of digital information between computer 226 and the remote control units is conventional.

Computer 226 is generally placed in a central location so that a local locker attendant can monitor the lockers and attend to any malfunctions or out of order problems that occur during normal usage. The second central computer 232 may be provided to allow monitoring and control of the locker system from a separate location, such as a police station, to allow authorities to open either all lockers or selected lockers to conduct search procedures or other official functions.

Figure 3:
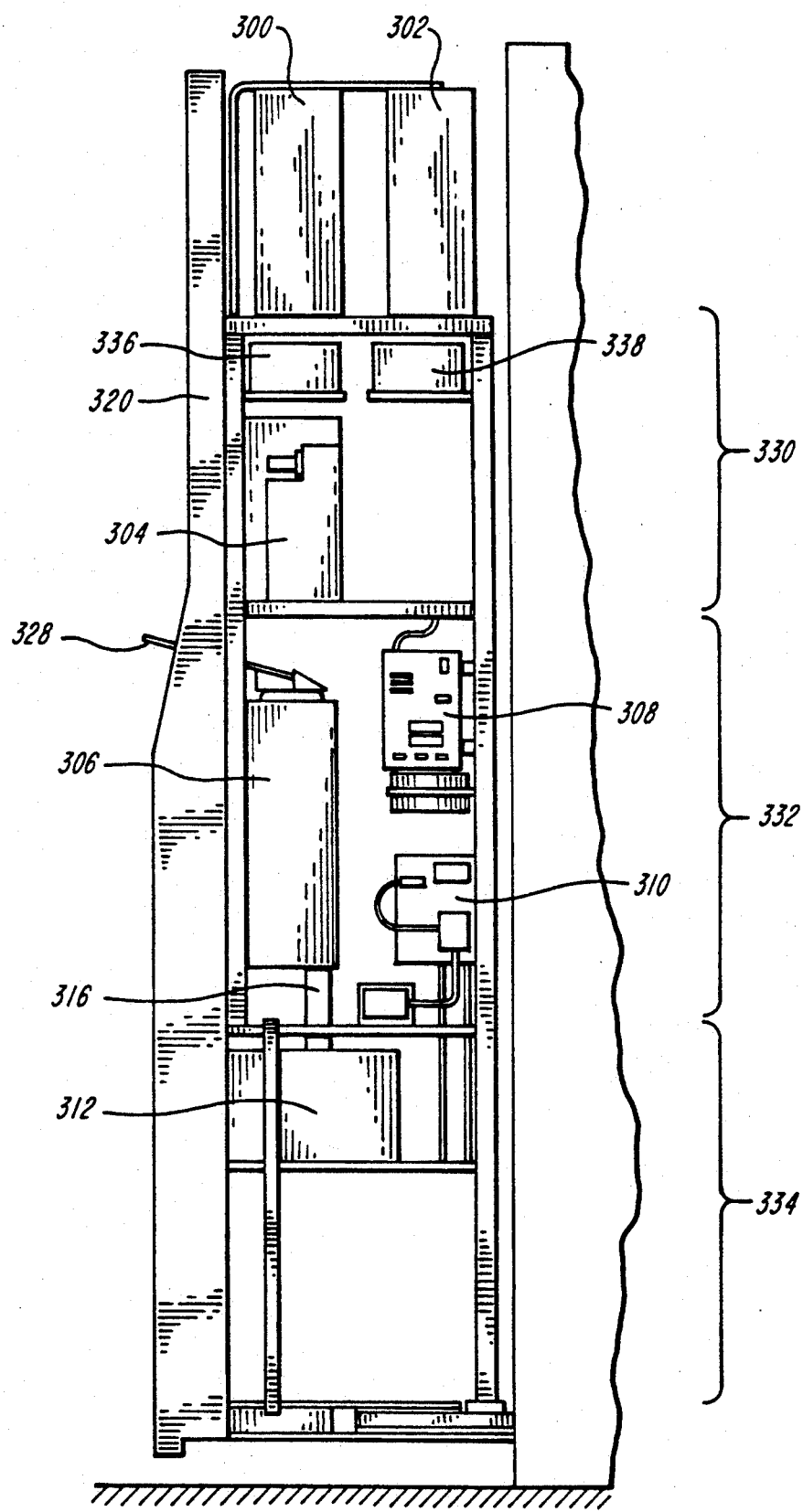
FIG. 3 is a schematic illustration of a remote control unit which has been pulled away from its associated lockers to display the internal components.

FIG. 3 shows a side view of the remote control unit 120, which has been pulled out and away from the lockers in order to show internal components.

As shown in FIG. 3, remote control unit 320 is contained on a frame which is mounted on slides and rolls back into a space between locker banks. Unit 320 can be locked in place so that it is non-accessible by users. Several pieces of equipment are contained in the remote control unit which function together to control and administer the associated lockers.

The equipment includes a printer 304, which is used, as will hereinafter be described, to print a ticket containing information needed by the locker user, such as locker location, passcodes, time and date.

Also included in unit 320 is an electronic coin handler 306. Handler 306 is a conventional unit which accepts and totals coins deposited into a coin slot (not shown) on the front of remote control unit 320. The electronic coin handler also contains a cancellation button or lever 328. The cancellation device can be manipulated by the user should the user decide to cancel a particular transaction to retrieve coins that have already been deposited into coin handler 306. Coin handling units such as unit 306 are conventional and will not be described further herein.

Coins accepted by unit 306 fall through a chute 316 into a coin box 312, where they can be collected by an attendant maintaining the locker system.

Also included in remote control unit 320 are computer electronics 300 and 302 which are, in turn, connected to a power supply 310. Computer units 300 and 302 are conventional units which comprises a microprocessor or computer connected to a conventional read-only memory (ROM) and a random access memory (RAM). The ROM contains microprogrammed instructions that control and operate the computer. The RAM is used to store rental information as will hereinafter be described and is connected to internal batteries (not shown) so that information regarding the rental will not be lost if power fails. The computer and memories are conventional components and will not be described further herein. The stored instructions cause the computer to operate in connection with the printer 304 and the coin handler 306 to handle the rental transactions. The computer can also display commands, balances owed, and other information on a display screen associated with the remote control unit (not shown in FIG. 3).

In order to keep the computer unit functioning in the case of a power outage, battery units 336 and 338 are used, which are kept charged by charger unit 308 when the locker unit has access to normal line power and which batteries provide emergency backup power for a short interval of time, such as three hours, to maintain the lockers in operation. Batteries 336 and 338 allow a user to reclaim the contents of a locker even though a power outage has occurred.

Remote control unit 320 is advantageously separated into three sections 330-334. These sections include a printer section, 330, containing printer 304; a coin handling section, 332, containing coin handler 306, computer 308 and power supply 310, and a coin box section 334 containing coin box 312. Sections 330 and 334 can be locked separately; section 332 can be accessed by pulling the unit away from the lockers as shown in FIG. 3. The division of unit 320 into sections 330-334 allows one local attendant to service the printer by clearing paper jams and restocking paper without having access to either the coin handler or the coin box. Another attendant can access the coin box section 334 to remove coins without having access to either the printer or the remainder of the circuitry.

In accordance with the invention, incremental rate parameters that control the fees charged for rental of individual lockers can be entered and modified at the central computer 226. An example of a visual display screen which illustrates the entry of rate information, is shown in FIG. 4. This screen is laid out in the format commonly referred to as a "MACINTOSH" user format or "point and click" format and is intended to be used with an input device such as a mouse. The display consists of a plurality of screen areas known as "windows" or "boxes" which can be selected by moving a pointer or cursor to the window and pressing a button located on the mouse. When the window is selected, information in that window may be entered or changed.

Referring to FIG. 4, the fee change screen displays several parameters which allow the locker rental fee rate structure to be changed for a group of lockers or all lockers simultaneously. For example, window 400 indicates the group or area which will be subject to the fee parameters indicated in the other windows. The area designated by window 400 may be as small as a single locker bank, for example bank 200 in FIG. 2, or may include an area such as locker banks 202-208 shown in FIG. 2, or might include all lockers. As previously mentioned, the remote control unit in each locker bank can be individually addressed so that the parameters stored in it can be changed at will by the central location. This change capability helps in maintaining and administering the locker configuration from the central location. As shown in FIG. 4, in the illustrative screen display, ALL of the lockers are selected in window 400.

The next piece of information which can be selected is the rental fee rate structure. A flat rate structure can be chosen by selecting area 402. This conventional rate structure imposes a single fixed fee for a particular locker size, for any time duration up to a maximum rental period which can be set as described below. Alternatively, an incremental rate structure can be chosen by selecting area 404 as shown. In accordance with the invention, the locker rental charge under the incremental rate system depends on the amount of time the locker is in use. As previously mentioned, the incremental rate structure sets up a plurality of time intervals during which each of which an incremental rate is charged.

In the screen display shown in FIG. 4, an additional rate parameter can be adjusted for both flat rate and incremental rate systems the fee amount charged can be adjusted for three different sized lockers by adjusting the amount shown in areas 406-410. Illustratively, three different fees have been chosen for the locker sizes, including $0.50 for a medium size locker, $0.75 for a large size locker, and $1.00 for a jumbo size locker. If the previously mentioned flat rate structure has been selected, then the specified fees apply for the entire rental period up to the maximum. Conversely, if the previously-mentioned incremental rate structure is chosen, then each of the specified fees applies for one of the incremental time periods.

For incremental rate systems, the length of each incremental time period can be set using window 412. Illustratively, the incremental time period has been set for thirty minutes. Thus, for a medium size locker, during each successive thirty minute period the incremental fee amount of $0.50 is added to the fee balance owed; during the first half hour, the rental fee will be $0.50, after an hour, the rental fee will be $1.00, after 1.5 hours the rental fee will $1.50, etc.

The number of incremental time periods before a maximum fee is reached, can be set via window 414. In the illustrative example, this has been set at 6 time periods, thus, after six one half hour periods or 3 hours total rental time, the rental fee for the locker reaches a maximum of $3.00 and does not increase as the rental time increases further. This maximum limit allows the rate structure to be tailored to arrive at a maximum rate which is attractive to long term users while still charging short-term users a reasonable rate for locker usage.

In some systems, a maximum rental period can be set using window 416. In such systems, after the maximum rental period has expired for a particular locker, the remote control unit associated with that locker signals the central location so that appropriate administrative action may be taken. For example, the contents of the locker may be removed to a secure area. When the user arrives to reclaim the luggage he is informed, via the display on the remote control unit, that he must see an attendant in order to reclaim it. This latter operation is useful to prevent heavily used lockers from being monopolized by a single party for indefinite periods of time. When the user reclaims the overdue luggage, an additional charge may also be made.

Several other conventional windows are shown in the illustrative FIG. 4 which aid in the administration of the fee parameters. For example, a password may be required to be entered in window 418 in order to change the fee information. The password prevents changes by any personnel other than the system manager and allows ordinary attendants to use the centralized location to monitor lockers without changing the basic information.

Other standard windows, such as an "OK" window 420, a "Cancel" window 422, and a "Help" window 424 are provided. The OK window can be selected when any or all of the changes have been verified by the manager. The Cancel window 422 is used to cancel any changes that have been made erroneously and the Help window 424 may be provided to access on-line "help" instructions if these are available with a particular program.

Although a particular screen display is shown in FIG. 4, which display is suitable for use with MACINTOSH computers, obviously, other screen displays displaying similar information can be generated in well known manners for other computer brands. The particular brand of computer is not important as long as it displays the correct information for changing the fee structure.

Once the fee structure information is accepted by entering the appropriate information and selecting the "OK" window 420, the information is stored in the central computer memory. Thereafter, the area information shown in box 400 is used to generate the actual system addresses of the selected remote control units by means of a configuration chart which had been previously stored in the central computer memory. After the addresses have been generated, the rate information is formatted and sent to each of the selected remote control units via the data bus protocol. More particularly, the rate information is retrieved from the central computer memory, forwarded to the computers in each of the selected remote control units and stored in the RAMs in the remote control units. The actual data transmission protocol, its format, and the method of sending information between computers depend on the particular computer and data bus used to implement the locker system. The details of the transfer can be obtained from the computer specifications. As any commercially-available data transfer software which is compatible with the computers used can be used to implement this portion of the locker system, the data bus and its operation will not be described further herein. Rate information stored in each of the remote control unit RAMs is used during later rate calculations as will hereinafter be described to compute and display an amount due and collect that amount from the user.

Figure 5:
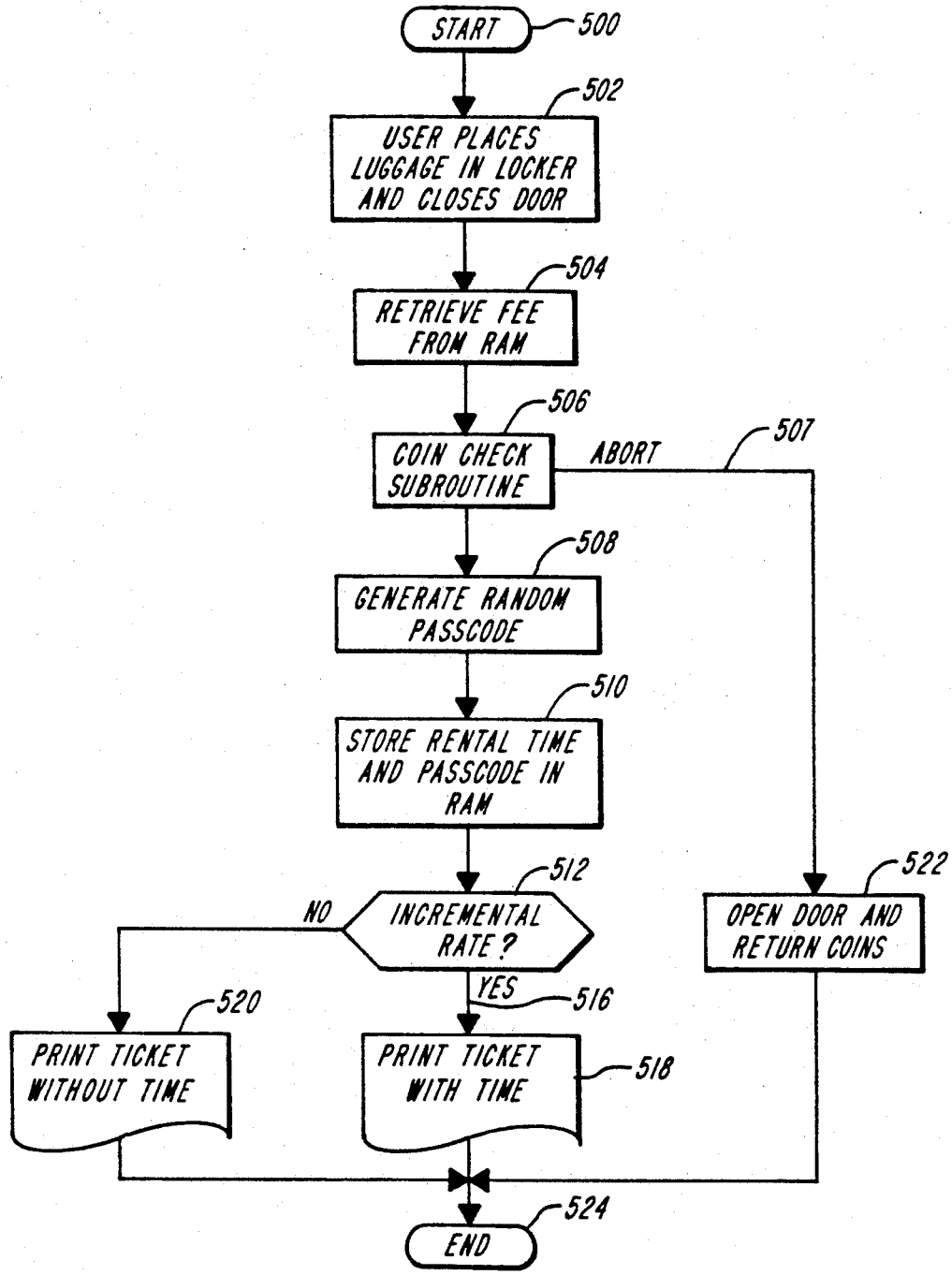
FIG. 5 is a flow chart of the steps performed by an illustrative software in the remote control units for initiating usage of a locker.

FIG. 5 shows a simplified flow chart of an illustrative software routine which might be used in a remote control unit to control the rental of a locker by a user. The routine starts as step 500 and proceeds to step 502, in which the user places the luggage in the locker and closes the door. Although, in the illustrative locker system shown in FIG. 1, the door latch 124 of illustrative locker 100 can be manually operated, the door is actually electronically locked and unlocked by means of a locking mechanism (not shown), which is not accessible to the user.

In response to the operation of handle 124, remote control unit 122 operates to electronically lock the door temporarily, until an initial fee deposit is collected. In the routine shown in FIG. 5, the initial deposit is required to keep the door locked. In connection with the next step 504, the appropriate rental fee is retrieved from the remote control unit RAM, the fee having been stored therein previously by means of the administrative routine previously described. In the case of a flat rate structure locker, the fee that is retrieved in step 504 is the fee which will be used for the entire rental period. However, in the case of an incremental rate structure locker, the fee that is retrieved from the RAM in step 504 will be the fee for the initial incremental period.

In either case, the routine then enters a coin check subroutine in step 506. This subroutine is described in more detail in connection with FIG. 7 and is used to display the amount which is required to secure the door of the locker and check that the proper coins have been deposited. The coin check subroutine includes a timing routine, which allows the user a reasonable time to insert coins. If this routine reaches a time-out period, then it is assumed that some malfunction has occurred. In this case, the ABORT path 507 is taken. Alternatively, if the user overpays the deposit, coin check subroutine 506 also follows the ABORT path 507. In the case of an aborted deposit acceptance, route 507 leads to step 522 in which the door is opened and coins that may have been deposited are returned to the user. The software routine is then finished at step 524.

Assuming that the proper coin deposit has been made and checked by the coin check subroutine 506, the rental routine next proceeds to step 508 at which a random 5-digit passcode is generated. This code is the confidential number which must be entered by the user at the end of the rental period to open the locker upon payment of any required fee. The passcode prevents unauthorized access to the locker by persons other than the actual user.

The routine next proceeds to step 510, at which the rental time is stored in the RAM in the associated remote control unit. The time is stored in order to determine whether the maximum rental time has been exceeded and to later compute the final fee balance which will be owed for incremental rate structure lockers. It is also possible to utilize a separate timer to determine the locker rental time but it is more economical to simply store the time at this point and perform a later calculation. Also, at this time, the passcode generated in step 508 is also stored in the associated RAM for later comparison to a passcode entered by a user reclaiming his luggage.

The routine next proceeds to step 512, in which a branch occurs depending on whether the incremental rate structure is in effect (as determined by the administrative selection previously described and stored in the associated RAM). If no incremental rate structure is in effect, branch 514 is selected and the routine proceeds to step 520, in which a ticket is printed giving the user selected information about the locker. This information may, for example, include the name and address of the locker site so that the locker can be located upon return, the five-digit passcode which the user must enter in order to reclaim the locker contents and may also include a notice about the maximum rental time. The routine then ends in step 524.

Figure 6:
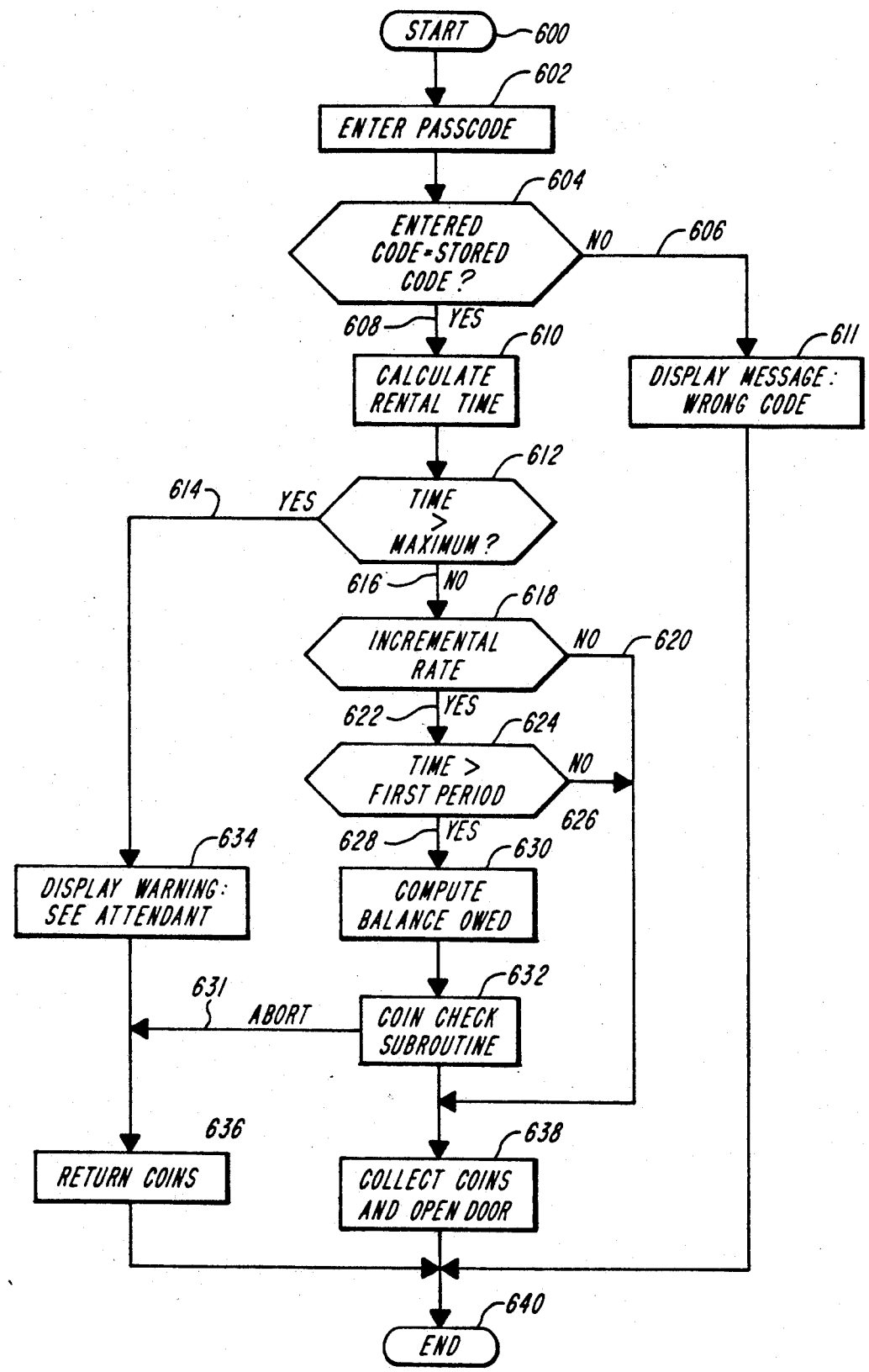
FIG. 6 is a flow chart of the steps performed by an illustrative software in the remote control units for collecting rental fees due and opening a locker.

Alternatively, if in step 512 it is determined that an incremental rate structure has been selected by the administrative selection, the routine proceeds, via path 516 to print a ticket 518. As with the flat rate structure, this ticket includes the name and address of the locker site and the five digit passcode. In addition, it includes the maximum time within which the luggage may be retrieved without payment of an additional rental fee. This additional time is the length of the first incremental time period set in window 412 of FIG. 4. The ticket may include other information such as the incremental rate structure or the rate structure may be displayed in signage located at various sites about the locker area FIG. 6 is a flow chart of a software routine which verifies that the user is authorized to reclaim the luggage, collects any rental fee due and opens the locker door to return the luggage to the user. The routine starts at step 600 and proceeds to step 602, in which the user is prompted to enter the passcode which is printed on his ticket.

After the passcode has been entered in step 604, it is compared to the passcode which is stored in step 510 of the previous routine shown in FIG. 5. If the entered passcode and the stored passcode are not equal, in step 604, the routine proceeds to branch, via path 606, to step 611 at which the message "WRONG CODE" is displayed to alert the user that an incorrect code was entered. The routine then proceeds to the end 640. It may also be advantageous to count the number of incorrect passcode entries so that the local attendant can be alerted after a predetermined number of incorrect entries, thereby preventing an unauthorized user from guessing the code by trial an error. The retry counter and associated logic has been omitted from the routine shown in FIG. 6, but could be added in a straightforward manner.

If the entered passcode and the stored passcode are equivalent, in step 604, the routine branches along path 608 to step 610. In step 610, the actual rental time is calculated. This may be performed, for example, by subtracting the current time from the initial rental time stored in step 510 of the previously described software routine or by reading an internal timer.

The routine then proceeds to step 612, in which the computed rental time is compared to the maximum rental time previously entered. If the rental time is greater than the maximum time in step 612, the routine branches, via branch 614, to step 634, in which a warning is displayed to the user directing him to see the local attendant. This branch would be taken, for example, if the luggage was left in the locker longer than a maximum period of, for example, 24 hours. In this case, the local attendant may have removed the contents of the locker to a central location and it is necessary for the user to pick the luggage up at that location.

From step 634 the routine proceeds to step 636, in which any coins entered are returned, and then the routine ends in step 640.

Alternatively, if, in step 612, the rental time is less than the maximum rental time, the routine proceeds, via branch 616, to step 618 in which the local RAM is checked to determine whether an incremental rate structure has been set for this locker. If not, the routine proceeds, via path 620 to step 638. If no incremental rate structure has been set for this locker, this means that the initial deposit is all that the user owes, and thus, in step 638 the door is opened and the locker contents returned with the routine then proceeding to the end in step 640.

However, alternatively, if in step 618, an incremental rate structure was chosen for this locker, the routine branches, via path 622, to step 624, where the computed rental time is compared to the first incremental time period stored in the RAM. If the computed rental time is not greater than the first incremental time period, the initial deposit was sufficient to cover the entire rental fee and the routine follows path 626 to step 638. The locker door is opened in step 628, and the routine ends in step 640.

However, alternatively, in step 624, if the rental time is greater than the first incremental time period, the routine branches, via path 628, to step 630. In step 630, the fee balance owed is computed.

Figure 8:
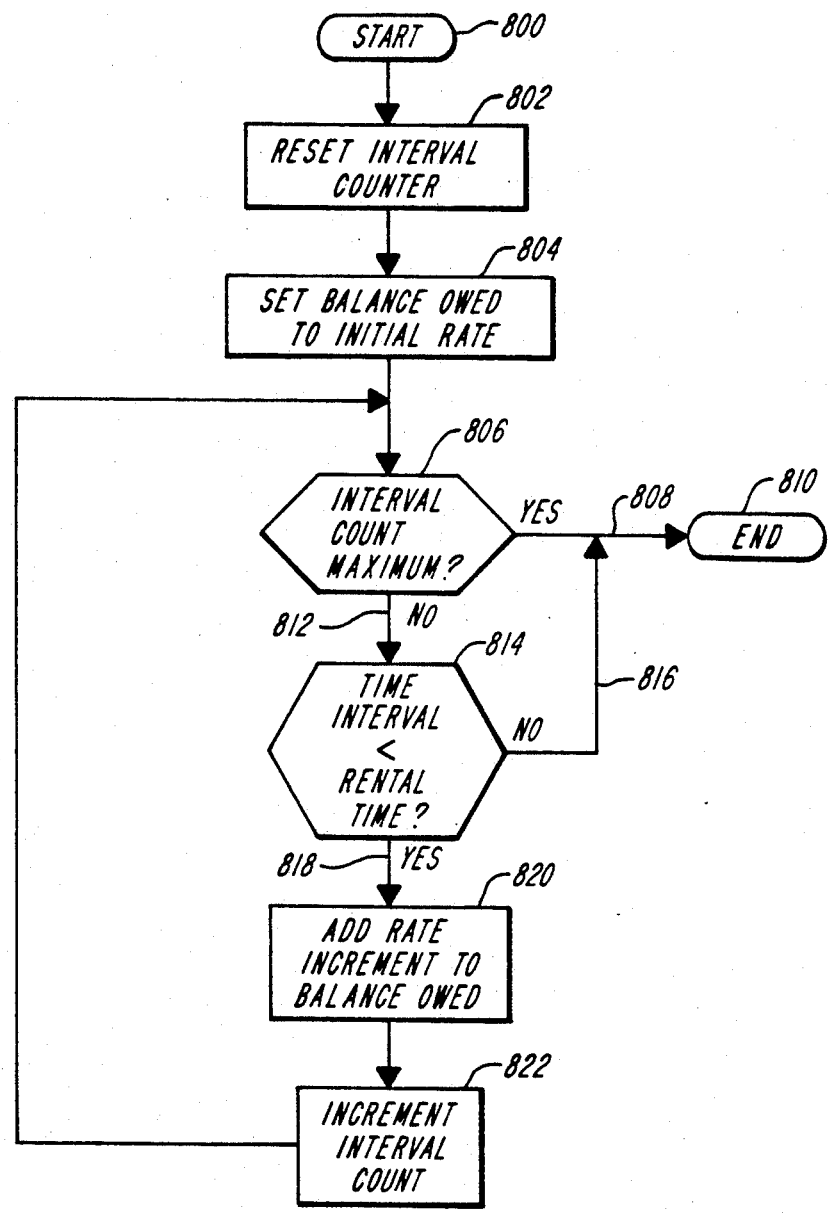
FIG. 8 is a flow chart of the steps performed by an illustrative software subroutine in the remote control units for calculating the balance owed in an incremental rate locker.

An illustrative flow chart for a software routine which computes the balance owed is shown in FIG. 8. The routine starts at step 800 and proceeds to step 802, in which an interval counter is reset to one. The interval counter counts the number of incremental time periods which are contained within the computed rental time.

The routine then proceeds to step 804, in which the balance owed is set to the incremental fee that has been previously selected by the administrative manager, as described above in connection with FIG. 4. In step 806, the interval count in the interval counter is compared to the maximum number of intervals (also previously selected by the administrative manager). If the interval count exceeds the maximum number of intervals, the routine proceeds, via path 808, to the end of the subroutine 810.

Alternatively, in step 806, if the interval count is less than the maximum, the routine proceeds, via path 812, to step 814, in which an incremental rental time (computed by adding the incremental time intervals) is compared to the actual rental time. If the computed incremental time interval is greater than or equal to the actual rental time, then the routine proceeds, via path 816, to the end 810.

Alternatively, in step 814, if the computed incremental time interval is less than the actual rental time, the routine proceeds, via path 818, to step 820, in which an additional fee increment is added to the balance owed. Next, in step 822, the interval count is incremented and the routine returns back to step 806.

Steps 806–822 are repeated until either the interval count exceeds the maximum number of intervals indicating that the maximum rental rate has been reached or the computed incremental time period is greater than the actual rental time, indicating that the total balanced owed has been computed.

Returning to FIG. 6, after the balance owed is computed in step 630, the routine proceeds to the coin check subroutine 632. As previously mentioned, this subroutine displays the amount owed and monitors the coin entry until the amount of coins entered equals the amount owed. Also, as previously mentioned, a time out in the coin check routine, or an over-payment results in an ABORT situation and the routine proceeds, via path 631, to step 636 where coins are returned, and to the end of the routine at step 640.

Alternatively, if the correct amount of coins is entered, the routine proceeds to step 638 where the coins are collected and the locker door is opened allowing the user to reclaim the contents. The routine then proceeds to the end 640.

Figure 7:
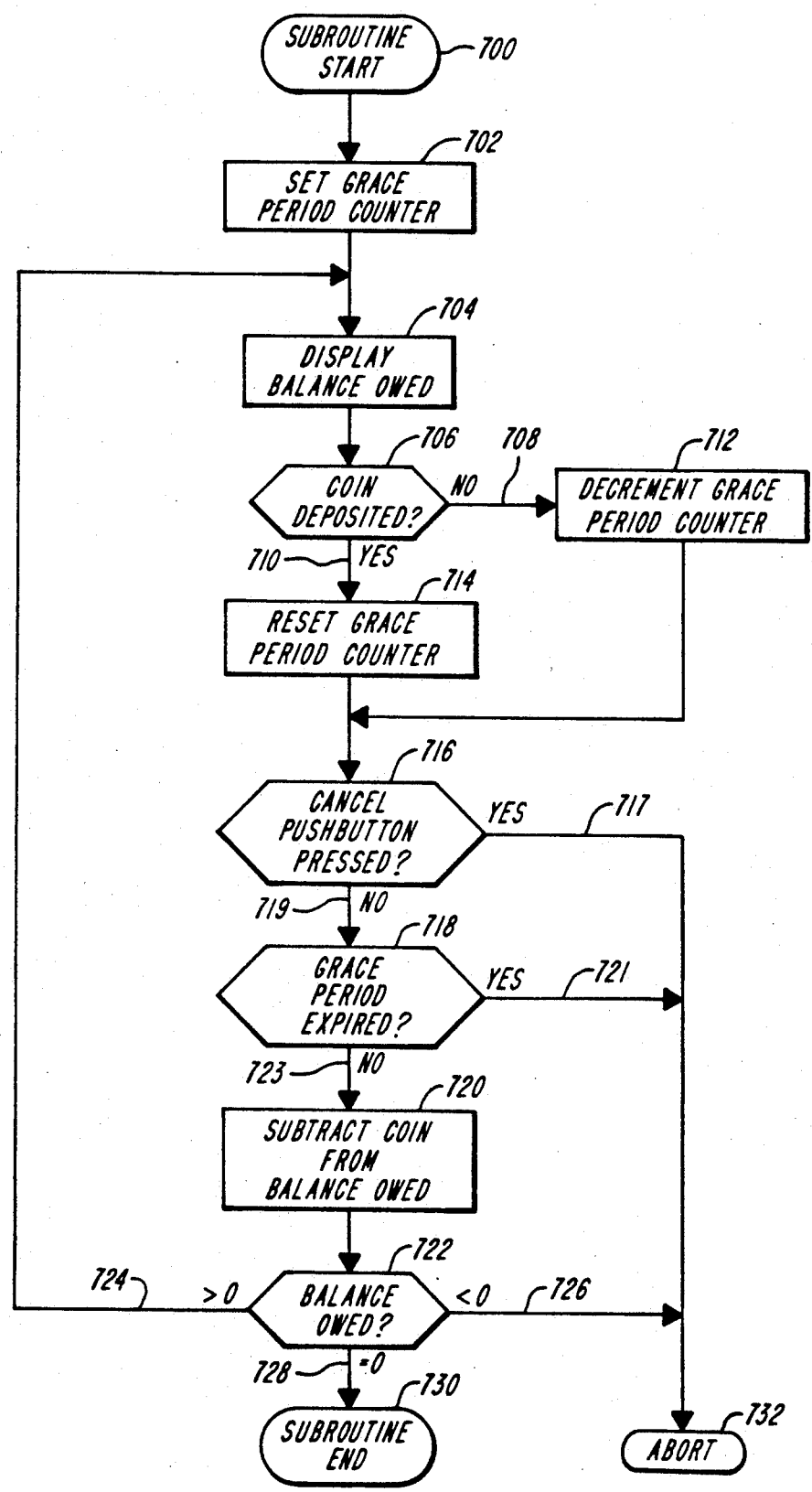
FIG. 7 is a flow chart of the steps performed by an illustrative software subroutine in the remote control units for collecting coins and displaying a balance owed for locker usage

An illustrative coin check subroutine which is useful in the routines shown in FIGS. 5 and 6 is shown in FIG. 7. The subroutine begins at start step 700 and proceeds to step 702, in which a grace period counter is set to a predetermined number. The grace period counter allows a predetermined period of time for the user to insert a coin into the electronic coin handler in the remote control unit. If a coin is not inserted or another action is not taken within the grace period, the timer expires causing the routine to abort.

After setting the grace period counter, the routine then proceeds to step 704 in which the fee balance is displayed. This display, for example, may take place on a small visual display screen located on the remote control unit (illustratively, display 126 on remote control unit 122 as shown in FIG. 1).

After the fee balance is displayed in step 704, the routine proceeds to step 706 where the electronic coin handler is polled to determine whether a coin has been deposited. If not, the routine branches, via path 708, to step 712 in which the grace period counter is decremented. If a coin has been deposited, then the routine in step 706 proceeds, via path 710, to step 714, in which the grace period counter is reset. Otherwise the counter is continually decremented at each pass through the subroutine loop.

After either resetting the grace period counter or decrementing the counter depending on a coin deposit, the routine proceeds to step 716 in which the cancel pushbutton is checked. This button allows a user to cancel coin entry and, if it has been pressed, the routine proceeds, via path 717, directly to the ABORT termination 732. If the cancel pushbutton has not been pressed, the routine proceeds, via path 719, to step 718, where the grace period counter is checked to see whether the entire grace period has expired. If it has, the routine proceeds via path 721 to the subroutine abort step 732. If the grace period is not expired in step 718, the routine proceeds via path 723 to step 720.

At step 720, the electronic coin handler is again polled to determine the amount of the coin which has been deposited. This amount is subtracted from the fee balance owed and the routine proceeds to step 722. At step 722, the balance owed is checked. If the balance is less than zero indicating an overpayment, the routine proceeds, via path 726, to the ABORT termination at 732.

Alternatively, if, in step 722, the balance owed is greater than zero, the routine proceeds back to step 704, via path 724, where the recalculated balance owed is displayed. The subroutine is repeated for each coin deposited.

If, at step 722, the balance owed has been reduced to zero, then the routine proceeds, via path 728, to the subroutine end 730 indicating that the balance owed has been fully paid.

Although only one embodiment of the inventive method has been described, modifications and changes will be immediately apparent to those skilled in the art. These modifications and other obvious changes are intended to be covered by the following claims.

What is claimed is:

1. In an electronic left luggage locker system having a central computer, a remote control unit with a memory, a locker controlled by said remote control unit and means for transferring information between said central computer and said remote control unit, an incremental rate fee system comprising:
   means located in said central computer and responsive to manual data input for storing rate data including an incremental fee, the time duration of an incremental interval and the maximum number of incremental time intervals;
   means for transferring said stored rate data to said remote control unit memory; and
   means located in said remote control unit and responsive to rate data stored in said remote control unit memory for computing a variable rental fee for use of said locker which fee depends on the length of a time interval during which said locker is in use.

2. In an electronic left luggage locker system, the incremental rate fee system according to claim 1 wherein said computing means comprises a computer located in said remote control unit.

3. In an electronic left luggage locker system, the incremental rate fee system according to claim 2 wherein said transferring means comprises a data bus connecting said central computer to said remote control unit computer.

4. In an electronic left luggage locker system, the incremental rate fee system according to claim 2 wherein said computing means further comprises means for computing a duration of said time interval during which said locker is in use.

5. In an electronic left luggage locker system, the incremental rate fee system according to claim 4 wherein said computing means determines said variable rental fee for use of said locker by determining the number of incremental intervals in said time interval duration and adding said incremental fee to said variable rental fee for each incremental interval in said time interval duration.

6. In an electronic left luggage locker system, the incremental rate fee system according to claim 5 wherein said computing means is responsive to said maximum number of incremental intervals stored in said remote control unit memory for limiting the number of incremental fees added to said variable rental fee to said maximum number of incremental intervals.

7. In an electronic left luggage locker system, the incremental rate fee system according to claim 4 wherein said computing means includes a clock means responsive to the deposit of luggage into said locker by a user of said locker for storing the time of said deposit in said remote control unit memory.

8. In an electronic left luggage locker system, the incremental rate fee system according to claim 7 wherein said computing means includes means responsive to the deposit of luggage into said locker by a user of said locker for generating a random multicharacter passcode.

9. In an electronic left luggage locker system, the incremental rate fee system according to claim 8 wherein said computing means includes a keyboard and means responsive to a manual entry of a passcode on said keyboard for storing a time of said entry in said remote control unit memory.

10. In an electronic left luggage locker system, the incremental rate fee system according to claim 9 wherein said computing means computes said duration of said time interval during which said locker is in use by subtracting said stored passcode entry time from said stored luggage deposit time.

11. An electronic left luggage locker system comprising:
   a central computer having a first memory and data input means;
   a locker module including a remote control unit with a second memory and a plurality of lockers controlled by said remote control unit;
   means located in said central computer and responsive to manual data entered on said data input means for storing rate data including an initial fee, the time duration of an incremental interval and the maximum number of incremental time intervals in said first memory;

data bus means for transferring said rate data stored in said first memory to said second memory and storing said rate data therein;

a timer located in said remote control unit for determining a time duration during which one of said plurality of lockers is in use; and a computer located in said remote control unit and responsive to rate data stored in said second memory and to said time duration during which one of said lockers is in use for computing a variable rental fee for use of said one of said plurality of lockers which fee depends on said time duration during which one of said lockers is in use.

12. An electronic left luggage locker system according to claim 11 wherein said computer in said remote control unit determines said variable rental fee for use of said one locker by determining the number of incremental intervals in said time duration and adding said incremental fee to said variable rental fee for each incremental interval in said time duration.

13. An electronic left luggage locker system according to claim 12 wherein said computer in said remote control unit is responsive to said maximum number of incremental intervals stored in said second memory for limiting the number of said incremental fees added to said variable rental fee to said maximum number of incremental intervals.

14. An electronic left luggage locker system according to claim 13 wherein said remote control unit further includes means for accepting coins from a user of said locker system and said computer in said remote control unit includes a clock means responsive to the deposit of coins for storing the time of said coin deposit in said second memory.

15. An electronic left luggage locker system according to claim 14 wherein said computer in said remote control unit includes means responsive to said deposit of coins for generating a random passcode number.

16. An electronic left luggage locker system comprising:

a central computer having a first memory and data input means;

a remote control unit having a second memory, a second computer, an electronic coin handler for receiving and validating coins entered into said remote control unit by a user of said locker system;

a plurality of lockers, each having a door with a handle and an electronic lock, said lock being controlled by said remote control unit;

means located in said central computer and responsive to data manually entered on said data input means for storing rate data including an incremental fee, the time duration of an incremental interval and the maximum number of incremental time intervals in said first memory;

data bus means for transferring said rate data stored in said first memory to said second memory, said second computer storing said rate data in said second memory;

means located in said remote control unit for determining a time duration during which one of said plurality of lockers is in use; and wherein said second computer is responsive to rate data stored in said second memory and to said time duration for computing a variable rental fee for use of said one of said plurality of lockers by determining the number of incremental intervals in said time duration and adding said incremental fee to said variable rental fee for each incremental interval in said time duration.

17. An electronic left luggage locker system according to claim 16 wherein said second computer is responsive to said maximum number of incremental intervals stored in said second memory for limiting the number of incremental fees added to said variable rental fee to said maximum number of incremental intervals.

18. An electronic left luggage locker system according to claim 17 wherein said remote control unit includes a clock means and said second computer is responsive to the deposit of coins into said electronic coin handler for storing the time of said coin deposit in said second memory.

19. An electronic left luggage locker system according to claim 18 wherein said remote control unit includes means responsive to the deposit of coins into said electronic coin handler for generating a random number passcode.

20. An electronic left luggage locker system according to claim 19 wherein said remote control unit includes means responsive to the deposit of coins into said electronic coin handler for printing a ticket having said random passcode printed thereon.

21. An electronic luggage locker system according to claim 20 wherein said remote control unit includes a keyboard and means responsive to a manual entry of a passcode on said keyboard for storing a time of said entry in said second memory.

* * * * *